Oct. 3, 1961 J. A. VETTEL, SR., ET AL 3,002,624
COMBINATION PUMP AND FILTER FOR RECIRCULATING LIQUID SYSTEMS
Filed Jan. 2, 1958 3 Sheets-Sheet 1

INVENTORS.
Joseph A. Vettel, Sr., Arthur C. Saxton,
John H. Zabel, Jr. & Ernest E. Cipolone,
BY
ATTORNEYS.

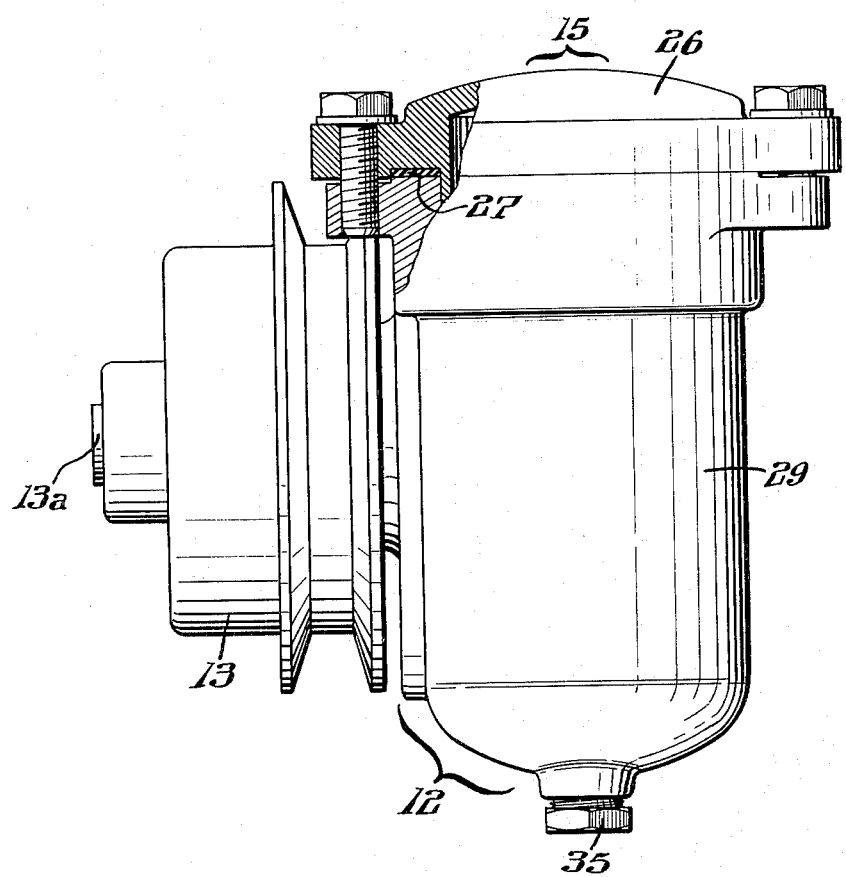

Oct. 3, 1961     J. A. VETTEL, SR., ET AL     3,002,624
COMBINATION PUMP AND FILTER FOR RECIRCULATING LIQUID SYSTEMS
Filed Jan. 2, 1958     3 Sheets-Sheet 3
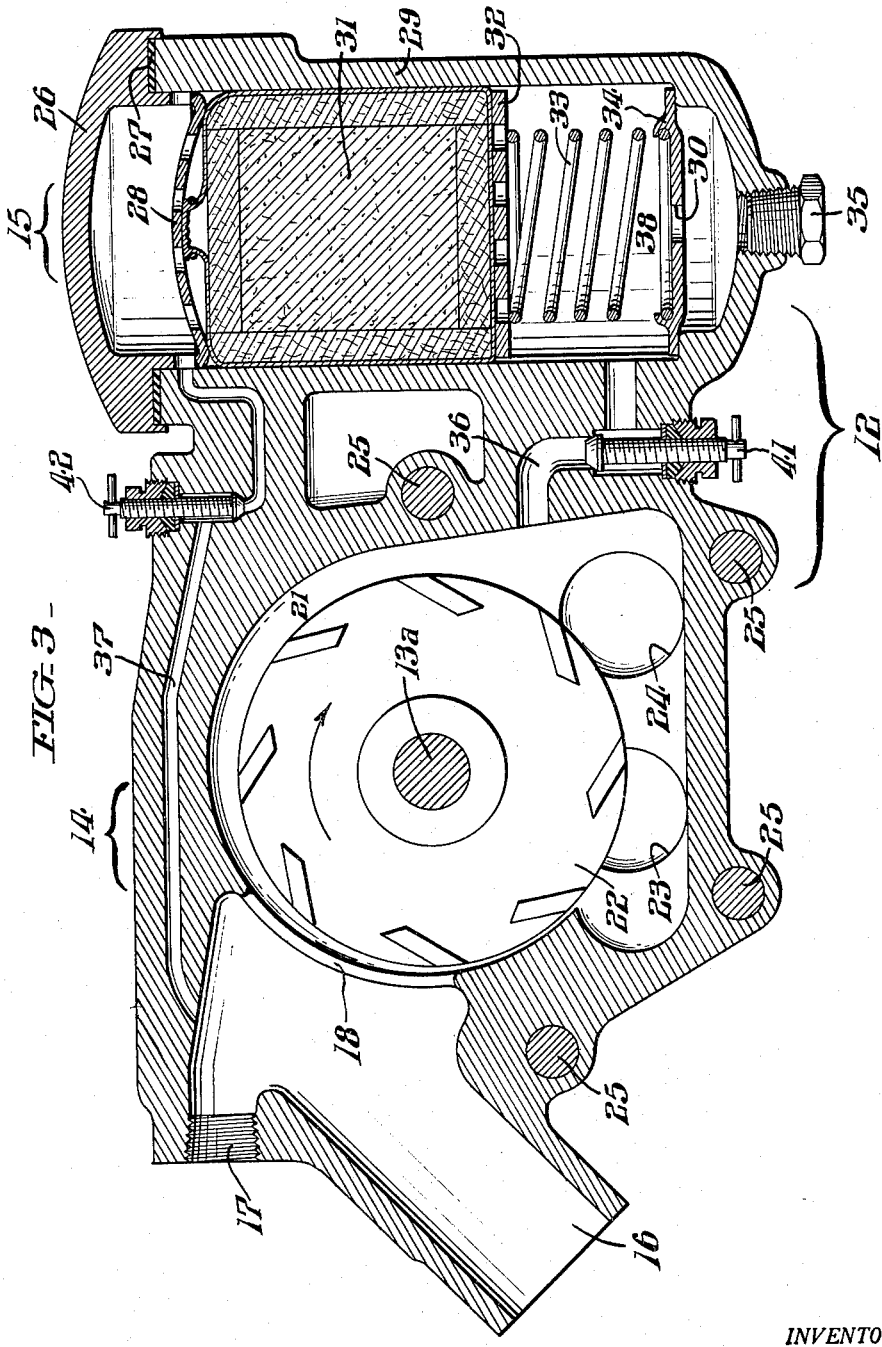
INVENTORS.
Joseph A. Vettel, Sr., Arthur C. Saxton,
John H. Zabel, Jr. & Ernest E. Cipolone,
BY
ATTORNEYS.

United States Patent Office 3,002,624
Patented Oct. 3, 1961

3,002,624
COMBINATION PUMP AND FILTER FOR
RECIRCULATING LIQUID SYSTEMS
Joseph A. Vettel, Sr., Haddonfield, N.J., Arthur C. Saxton, Lakewood, Ohio, John H. Zabel, Jr., Bridgeport, Pa., and Ernest E. Cipolone, Brooklawn, N.J., assignors to R. M. Hollingshead Corporation, Camden, N.J., a corporation of New Jersey
Filed Jan. 2, 1958, Ser. No. 706,818
3 Claims. (Cl. 210—167)

This invention relates to improvements in recirculating liquid systems, such as cooling systems for internal combustion engines, closed water systems for heating buildings, air conditioning systems, and the like, and more particularly concerns a combination pump and filter for use in such systems.

In recent years, filters for treating the liquids used in recirculating liquid systems have gone into wide use. Such filters are used for the purposes of eliminating from the systems harmful sludge, dirt and hard water mineral deposits, preventing rust and mineral deposits from forming, retarding corrosion resulting from electro-chemical activity and eliminating excessive acidity or alkalinity (pH control).

Such filters have proven particularly useful in cooling systems for internal combustion engines used in stationary installations and in powering vehicles, such as automobiles, buses, boats, earth-moving equipment and the like. In the past, filters for internal combustion engines have been mounted as individual units on brackets externally of the engine block at some point accessible to its cooling system. They require, of course, numerous long hose lines or similar conduits, with appropriate connections, to conduct the coolant in the engine cooling system to and from the filter. Because cubic space in vehicle engine compartments is quite limited, great difficulty often has been encountered in endeavoring to satisfactorily mount the filter and its bracket, conduits and connections adjacent the engine block. A further difficulty arises from the fact that the external conduit connections often become subject to leakage after a relatively short period of use.

It is an object of this invention to overcome the above mentioned difficulties encountered in the use of filters for recirculating liquid systems.

It is a further object of this invention to provide a unitary pump and filter unit for recirculating liquid systems which is simple to install, easy to service and economical to manufacture in quantity.

It is still another object to provide such a unit which maintains high pressure in the system without impeding flow of the liquid.

It is another object of this invention to provide a combination pump and filter unit for internal combustion engine cooling systems which is compact and which occupies a minimum of space in the engine compartment.

A further object of this invention is to provide for recirculating liquid systems, such as, for example, the cooling system of an internal combustion engine, an integral pump and filter housing, a pump within the housing for circulating the liquid, ports and passageways in the housing for conducting the liquid to and from the pump into the liquid system, a filter within the housing and passageways in the housing in communication between the pump and the filter for passage of liquid through the filter.

Other objects and advantages of this invention will become apparent from the following description of the preferred embodiment thereof shown in the drawings, in which:

FIG. 2 is a view in elevation, partly broken away, of the unit shown in FIG. 1; and FIG. 3 is a sectional view taken as indicated by the lines and arrows III—III which appear in FIG. 1.

Figure 1:
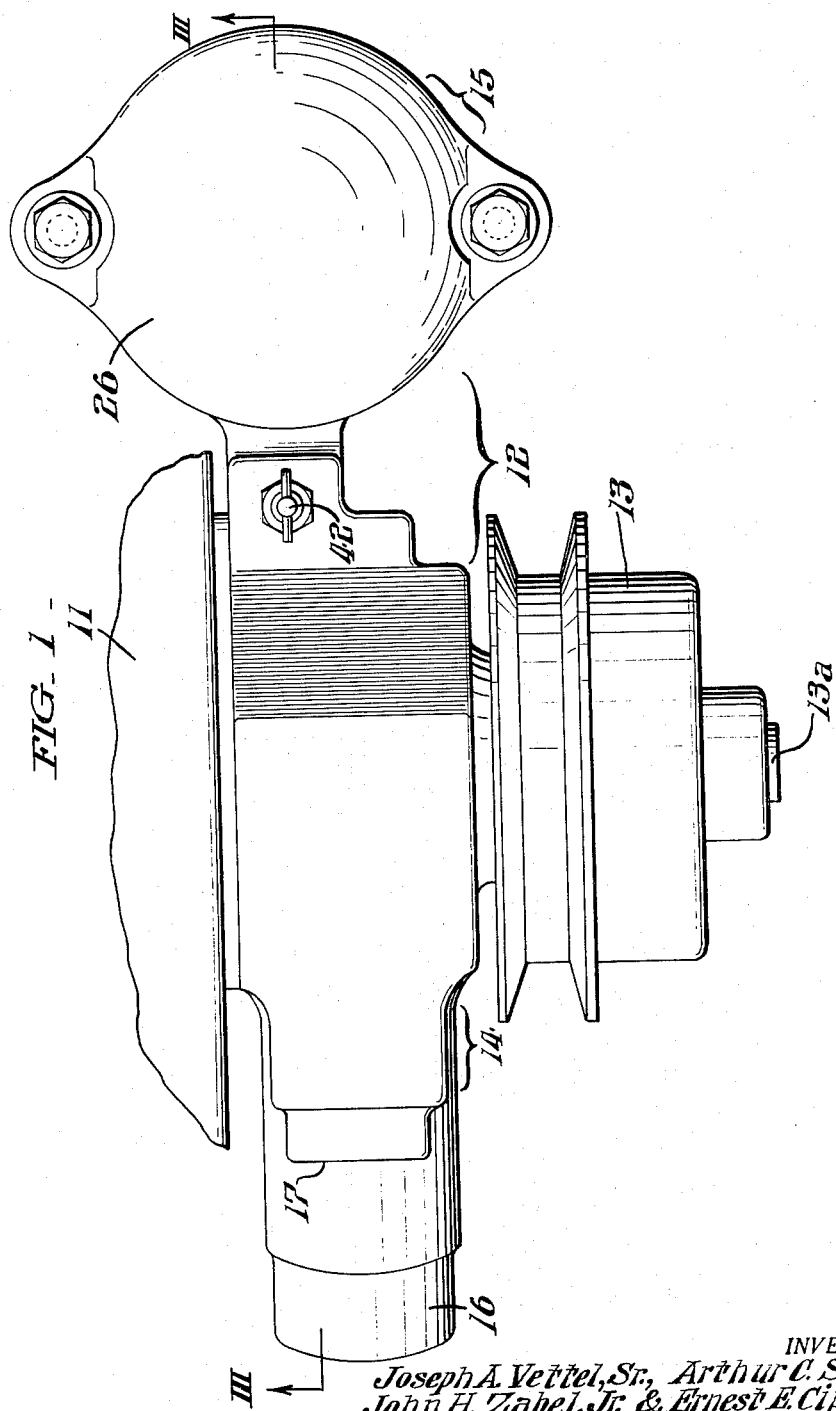
FIG. 1 is a view in top plan of a combination pump and filter unit constructed in accordance with this invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 11 designates the block of an internal combustion engine for a vehicle on which is mounted a housing 12 which, in turn, supports a pulley 13 on shaft 13a. Housing 12 is divided into a pump section 14 and a filter section 15, and includes a liquid inlet 16 which is connected by an exterior hose line (not shown) to the bottom of the radiator (not shown) of the liquid cooling system of the engine. If desired, a second inlet 17 may be connected by an exterior hose line (not shown) to a heater for the vehicle powered by the engine. Inlets or passageways 16 and 17 communicate with pump chamber 21 through port 18 within the housing 12. Rotatably supported in chamber 21 by any well known means is pump impeller 22 driven, through pulley 13 on the common shaft 13a, from the engine crankshaft in the usual manner. Exit ports 23 and 24 in pump chamber 21 are connected to engine block 11, i.e. the water jacket of said block, directly or by appropriate hoses (not shown). Housing 12 is affixed to engine block 11 by appropriate mountings, such as bolts 25.

Filter section 15 of housing 12 is preferably constructed in accordance with the filter shown and described in U.S. Patent No. 2,685,565 issued to L.V. Jones et al. on August 3, 1954. Filter section 15 includes a housing 29 of hollow, generally cylindrical construction with a drain plug 35 in the bottom thereof and a detachable cover 26 and gasket 27 at the top thereof. Disposed in the chamber 38 of the housing 29 is a perforated upper plate 28, a filter cartridge 31, a perforated lower plate 32, a supporting coil spring 33 and a sump plate 34 having an aperture 30 therein, all as described in the aforementioned Patent No. 2,685,565.

Communication between pump chamber 21 and the chamber 38 of filter housing 29 is provided by filter inlet passageway 36, extending from the pressure side of the pump 21 to the lower portion of filter chamber 38, and by filter outlet passageway 37, extending from the upper portion of chamber 38 to the suction side of the pump 21. Filter inlet passageway 36 is provided with a shut-off valve 41, while filter outlet passageway 37 is provided with a shut-off valve 42.

In operation, coolant is pumped by the pump 22 from chamber 21 through ports 23 and 24 to the engine block 11 where it circulates in the usual manner. The coolant is returned from the jacket of the engine block to pump 22 through an appropriate hose connection (not shown) and inlet passage 16 and port 18. Where a hot water heater is utilized for heating the vehicle powered by the engine, a portion of a heated coolant is conducted or "bled" from the engine block cooling system to the heater, as is will understood in the art. Such coolant is returned to the pump 21 from the heater through an appropriate hose connection (not shown), passageway 17 and port 18.

A portion of the coolant in chamber 21 is pumped through passageway 36 to chamber 38, whence it passes through the perforations of plate 32, filter cartridge 31, the perforations of plate 28 and then exits from chamber 38 to the suction side of the pump through passage 37. In this manner, coolant is constantly conducted or "bled" from the cooling system through the filter section for appropriate treatment, as may be desired.

In replacing filter cartridge 31, or in replacing or repairing any of the other elements in filter section 15, flow of coolant to the chamber 38 is closed off by means of shut-off valves 41 and 42. These valves may also be utilized, if desired, to control the flow of coolant through the passages 36 and 37.

One of the problems invariably encountered in the design of cooling systems for internal combustion engines is that of corrosion and pitting of metal parts arising from the electrolytic action established through the coolant by the dissimilar metals in the system. Whenever two different metals, such as iron and copper, are placed in contact with each other through immersion in water, electrolytic currents flow through the water from one metal to the other. Although these currents are very weak, over a period of time they cause localized corrosion or pitting. The deleterious effects caused by such activity may be controlled by the method of electrolytic reduction taught in the aforementioned Patent No. 2,685,565, i.e. by constructing one or both of the plates 28 and 32 of an expendable anodic metal high in the electro-chemical series with respect to iron, such as magnesium, aluminum or zinc. Such expendable metal plates create a minute cathodic current which flows from the plates to the engine block, thus resulting in the corrosion forces attacking the plates instead of the important engine parts.

It is to be noted that the cross-sectional area of filter inlet passageway 36 is larger than the cross-sectional area of filter outlet passageway 37. By making passageway 36 of relatively large dimension, a reduction is effected in the electrical resistance of the coolant path leading from the plates 28 and 32 through passageway 36 and pump chamber 21 to the engine block 11. The cathodic current which follows such coolant path (the coolant acting as a conductor therefor) encounters reduced resistance to flow in direct proportion to increases in the cross-sectional area of passageway 36. This condition is analogous to the use of a copper wire conductor for electricity where resistance to the flow of current is inversely proportional to the cross-sectional area of the conductor.

Passage 37 is of smaller cross-sectional area than passage 36 for the reasons: (1) the coolant exiting from the chamber 38 has been filtered free of foreign matter, and hence is able to pass easily through a more constricted area, and (2) to reduce the rate of flow of coolant from the filter chamber 38 and thereby maintain the coolant in the chamber 38 under high pressure.

For Diesel engines used to drive tractor-trailers, highly satisfactory results will be obtained in the use of this invention by employing a pump having a capacity of approximately 100 gallons per minute at cruising speed under normal load conditions, with passageway 36 formed with a diameter of approximately ⅜ of an inch and passageway 37 formed with a diameter of approximately ⅛ of an inch.

From the foregoing description, it will be seen that the novel combination pump and filter unit of this invention is highly compact, and, when used in connection with internal combustion engines for vehicles, requires only a minimum of space for mounting within the engine compartment. It successfully combines the heretofore separate pump and filter units of internal combustion engines within a single housing, thus utilizing a single installation where previously two have been required. Further, the installation of the combination unit of this invention eliminates extra hose connections heretofore necessitated by the separate mounting of the filter unit.

The combination pump and filter unit of this invention is readily adaptable to virtually all types of systems where liquids, particularly water, are recirculated. For example, this invention may be used in closed water systems used for heating buildings. In such heating systems, the warm water used to heat the building is recirculated by means of a pump, as is well known in the art. The combination pump and filter unit of this invention may readily be substituted for the pump heretofore used in such heating systems, thereby introducing into the system all the advantages inherent in this invention.

Similarly, the combination pump and filter unit of this invention may be employed in air conditioning systems, such as those incorporating cooling towers, wherein water is recirculated for the purpose of cooling and conditioning air. As will be readily understood, the pumps used in such air conditioning systems may readily be replaced by the combination pump and filter unit of this invention, thereby incorporating in such systems all of the attendant advantages thereof.

It is to be understood that while a preferred embodiment of this invention has been described in detail, it will be obvious to one skilled in the art that various modifications may be made therein without departing from the invention as herein claimed.

Having thus described our invention, we claim:

1. As a new product of manufacture, a combination pump and filter-conditioner unit for use in a liquid circulating system of an internal combustion engine, said unit comprising an integral housing, a pump chamber formed in said housing and a separate filter chamber likewise formed in said housing, an outlet opening leading from the delivery side of the pump chamber, a duct formed in the housing and extending between the delivery side of the pump chamber and the lower portion of the filter chamber, a duct formed in the housing and extending between the top of the filter chamber and the suction side of the pump chamber; an impeller operative within the pump chamber; a filter cartridge within the filter chamber whereby, during operation of the pump, the liquid is continuously circulated in the system with attendant bypassing of a portion thereof through the filter chamber and back to the pump chamber by way of the aforesaid ducts; and adjustable valve means for regulating the rate of liquid flow through the by-pass ducts or for completely obstructing said ducts when the cartridge in the filter is to be replaced.

2. As a new product of manufacture, a combination pump and filter-conditioner unit for use in a liquid circulating system of an internal combustion engine, said unit comprising an integral housing, a pump chamber formed in said housing and a separate filter chamber likewise formed in said housing, an outlet opening leading from the delivery side of the pump chamber, a duct of large diameter formed in the housing and extending between the delivery side of the pump chamber and the lower portion of the filter chamber, a duct of smaller diameter formed in the housing and extending between the top of the filter chamber and the suction side of the pump chamber; an impeller operative within the pump chamber; a filter cartridge within the filter chamber whereby, during operation of the pump, the liquid is continuously circulated in the system with attendant by-passing of a portion thereof through the filter chamber and back to the pump chamber by way of the aforesaid ducts; and separate valves interposed in said ducts and adjustable from the exterior for controlling the rate of fluid flow by-passed through the filter.

3. As a new product of manufacture, a combination pump and filter-conditioner unit for use in a liquid circulating system of the internal combustion engine of a motor vehicle; said unit comprising an integral housing, a pump chamber formed in said housing and a separate filter chamber likewise formed in said housing, an outlet opening leading from the delivery side of the pump chamber, a duct formed in the housing and extending between the delivery side of the pump chamber and the lower portion of the filter chamber, a duct formed in the housing and extending between the top of the filter chamber and the suction side of the pump chamber, pump inlet passage in said suction side of pump chamber being adapted for connection to a radiator, an auxiliary inlet opening in said suction side of pump housing leading to the pump chamber for a hose connection to a heater in the vehicle; an impeller operative within the pump chamber; and a filter cartridge within the filter chamber whereby, during operation of the pump, the liquid is continuously circulated in the system with attendant by-passing of a portion thereof through the filter chamber and back to the pump chamber by way of the aforesaid ducts.

References Cited in the file of this patent

UNITED STATES PATENTS

| | | |
|---|---|---|
| 1,750,935 | Maunula et al. | Mar. 18, 1930 |
| 1,752,050 | Young | Mar. 25, 1930 |
| 1,919,331 | Imhoff | July 25, 1933 |
| 2,106,218 | Krieck | Jan. 25, 1938 |
| 2,286,816 | Kishline | June 16, 1942 |
| 2,381,141 | Russell | Aug. 7, 1945 |
| 2,460,058 | Brodeur | Jan. 25, 1949 |
| 2,462,819 | Trail | Feb. 22, 1949 |
| 2,463,459 | Gunn | Mar. 1, 1949 |
| 2,474,009 | Molyneux | June 21, 1949 |